BUZZ-HISS DECISION SYSTEM FOR A CHANNEL VOCODER

Filed Dec. 4, 1961 2 Sheets-Sheet 1

INVENTORS.
JOHN R. SAMUELSON
BY THEODORE M. STUMP
Robert L. Nathans
ATTORNEY

March 30, 1965 J. R. SAMUELSON ETAL 3,176,073

BUZZ-HISS DECISION SYSTEM FOR A CHANNEL VOCODER

Filed Dec. 4, 1961 2 Sheets-Sheet 2

3,176,073

BUZZ-HISS DECISION SYSTEM FOR A CHANNEL VOCODER

John R. Samuelson and Theodore M. Stump, Webster, N.Y., assignors to General Dynamics Corporation, Rochester, N.Y., a corporation of Delaware
Filed Dec. 4, 1961, Ser. No. 156,786
5 Claims. (Cl. 179—1)

The present invention relates to "buzz-hiss" decision circuits utilized in channel vocoders.

In prior art vocoders, the so-called "buzz" generator is provided at the receiver for synthesizing voiced sounds, and the so-called "hiss" generator is provided for synthesizing non-voiced, or fricative, sounds. A "buzz-hiss" decision circuit is utilized for determining whether the particular type of sound transmitted is a voiced sound or a fricative sound. This circuit controls a "buzz-hiss" switch at the receiver for enabling either the "buzz" generator or the "hiss" generator, depending upon the decision made. Fricative sounds produce more energy in the upper frequency portion of the voice channel than in the lower frequency portion and vice versa for voiced sounds. This phenomenon affords the basis of operation of the decision circuits. However, where a band-limited facility is utilized between a standard telephone and a vocoder, it becomes impossible to make a correct decision for all cases. Variations in the attenuation of different facilities and in the voice energy distribution of different transducers aggravate the problem. In addition, when the band width is limited, fricative energy must be looked for at frequencies where some voice sounds still have appreciable energy. The resulting decision errors degrade the quality of the sound produced in the output circuit of the vocoder. It has been found that the synthesized sound is more degraded by having the "hiss" generator erroneously enabled for voice sounds than it is by having the "buzz" generator erroneously enabled during the transmission of fricative sounds.

Accordingly, it is the principal object of the present invention to provide a new and improved vocoder "buzz-hiss" decision circuit.

It is a further object of the present invention to provide a new and improved vocoder "buzz-hiss" decision circuit which eliminates most of the degeneration in voice quality caused by incorrect decisions of prior art "buzz-hiss" decision circuits.

Further objects and advantages of the invention will become apparent as the following description proceeds, and the features of novelty which characterize the invention will be pointed out with particularity in the claims annexed to and forming a part of this specification.

Figure 1:
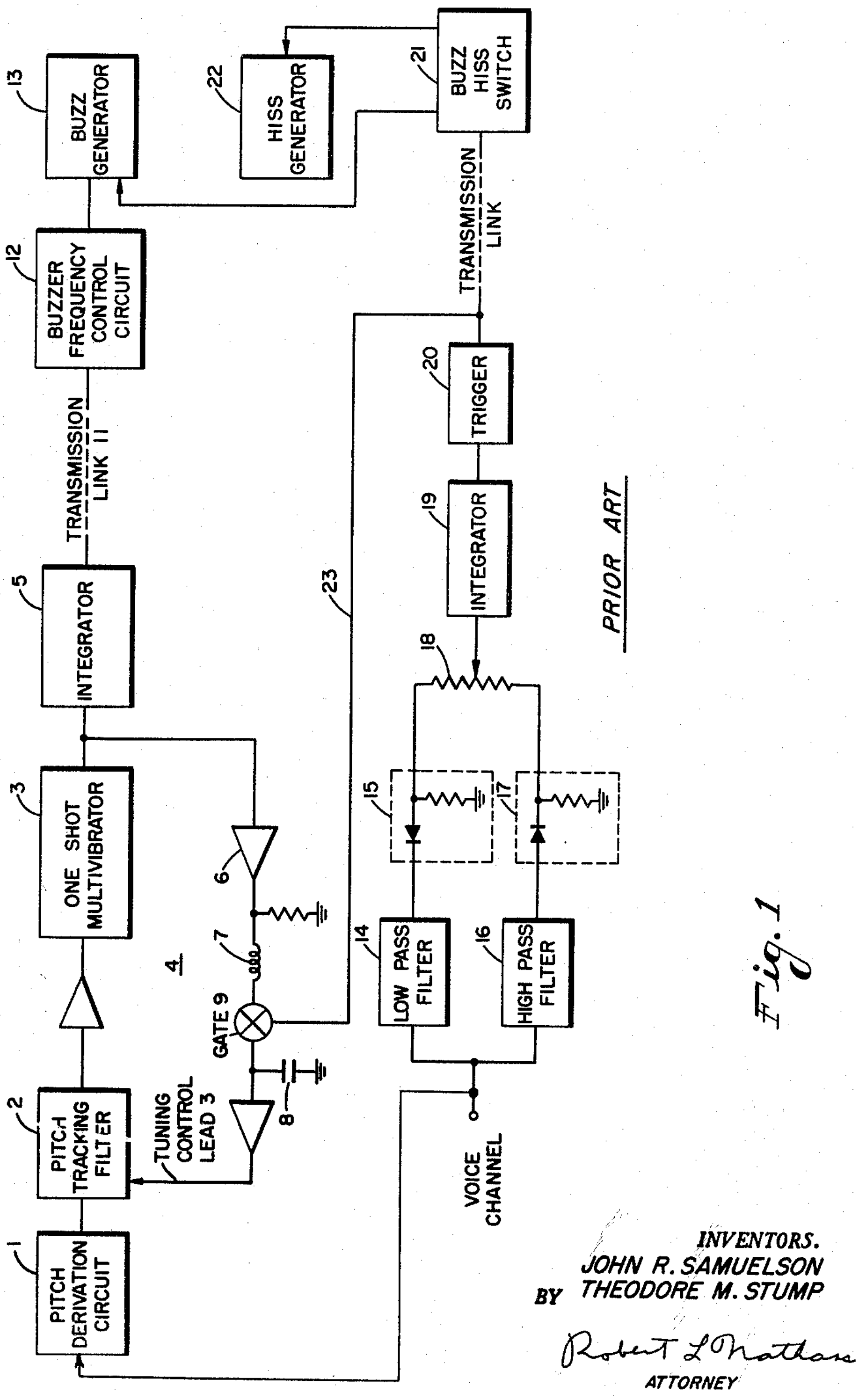

For a better understanding of the invention, reference may be had to the accompanying drawing in which:

FIG. 1 discloses a typical prior art "buzz-hiss" decision circuit, and

Figure 2:
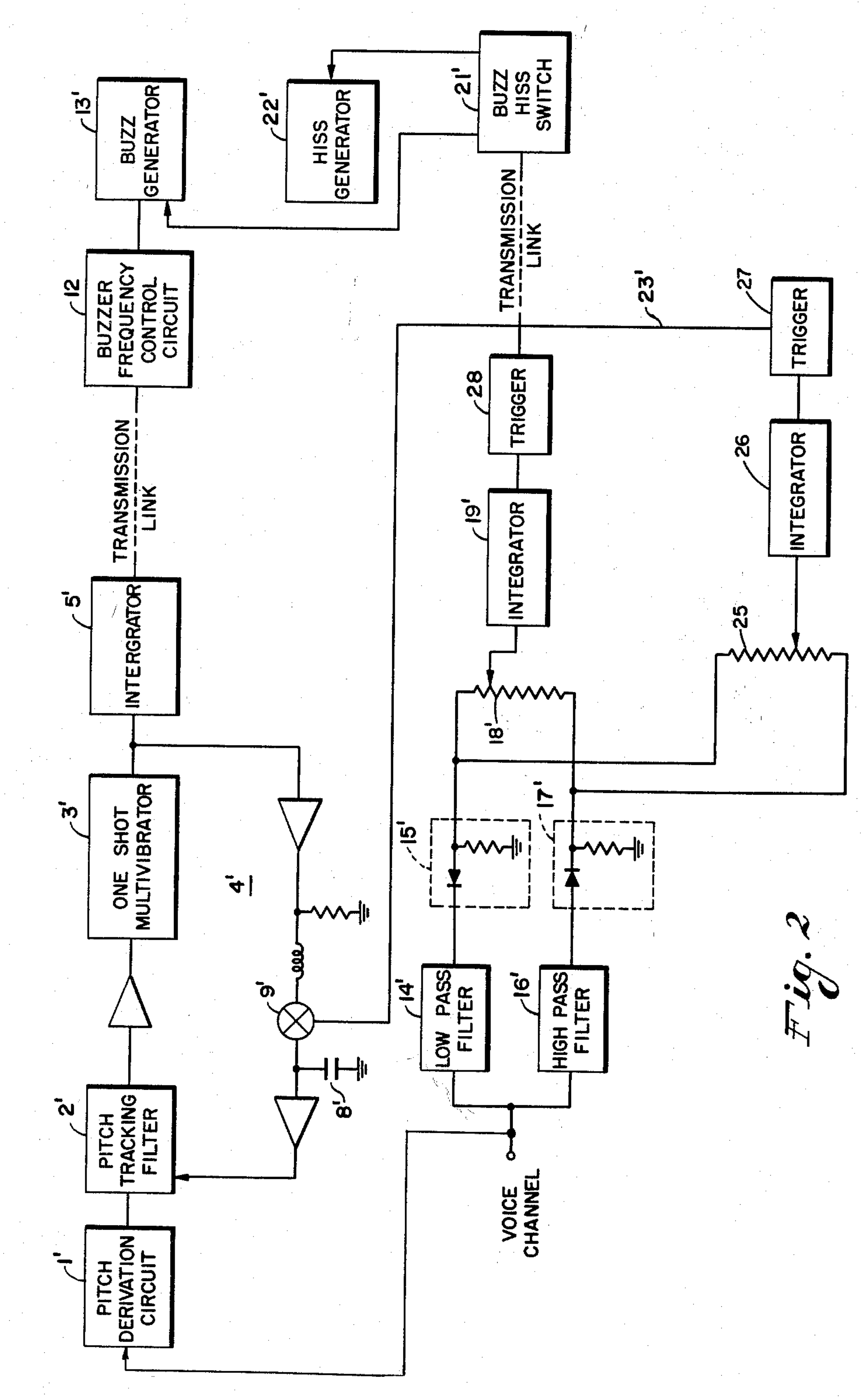

FIG. 2 discloses a preferred embodiment of the present invention.

In accordance with the present invention, a first decision circuit is provided to cause the "hiss" generator to be activated and to cause the "buzz" generator to be deactivated only where a substantial majority of the energy in the voice channel is distributed in the upper frequency portion of the channel. That is, considerably more energy must be distributed in the upper frequency portion of the channel than is found in the lower frequency portion of the channel. In contrast with typical decision circuits of the prior art, the existence of slightly more energy in the upper frequency portion compared with energy found in the lower frequency portion will not cause the "hiss" generator to be activated since there is a possibility that this condition is not really indicative of fricative sound. In other words, the first decision circuit favors the "buzz" generator.

A second decision circuit is provided which enables the control circuit of the pitch tracking filter only where a considerably greater quantity of energy is distributed in the lower frequency portion of the voice channel compared to the energy found in the upper frequency portion. Accordingly, the existence of slightly more energy in the lower frequency portion of the voice channel when compared to the energy found in the upper frequency portion will not allow the setting of the tracking filter to be changed (in contrast with prior art decision circuits) since there is a possibility that this condition is not really indicative of voiced sounds. To erroneously cause the center frequency of the tracking filter to be drastically shifted away from the pitch frequency in response to fricative sound results in considerable degradation in quality.

A typical prior art "buzz-hiss" decision circuit is schematically disclosed in FIG. 1. For the most part, the details of the sub-circuits are not disclosed since they are very well known to those skilled in the vocoder art. A standard pitch derivation circuit 1 is shown having its input circuit coupled to voice channel 9 and having its output circuit coupled to pitch tracking filter 2, whose center frequency may be readily altered with changes in the D.C. level on tuning control lead 3. The range of the pitch tracking filter will be in the neighborhood of 75 to 300 cycles per second. Voice channel 9 schematically represents the output circuit of the audio source, which, of course, is also the input circuit to the vocoder circuits (not shown), such as those disclosed in Steinberg Patent 2,635,146 of April 14, 1953. Voice channel 9 corresponds to the output circuit of amplifier 12 of this patent. A tracking control circuit 4 is provided for changing the center frequency of pitch tracking filter 2 in response to changes in frequency of the signals produced in the output circuit of the filter. The leading edge of the pitch signal produced in the output circuit of filter 2 triggers one shot multivibrator 3 connected, as shown, to integrator 5, which may be a twenty-cycle low-pass filter. The variable frequency pulse train produced by multivibrator 3 is integrated by virtue of current smoothing inductor 7 and capacitor 8 during those intervals when gate 9 is enabled. Since the pulse widths of the impulses produced by multivibrator 3 remain constant, it follows that the duty cycle and hence the average D.C. level of the pulse train will be proportional to the frequency of the pulse train, which is, in turn, directly proportional to the pitch frequency. The The capacitance of the capacitor 8 is made sufficiently large so that this capacitor intergrates and stores the aforementioned D.C. level and applies said level to the tuning control lead 3. The integrator 5 also produces a D.C. output signal which is directly proportional to the pitch frequency. This signal is transmitted over a transmission link 11 to buzzer frequency control circuit 12. In actual practice, the D.C. signal produced by integrator 5 would probably be encoded at the transmitter and decoded at the receiver. However, this structure is not shown since it is not pertinent to the present invention. The "buzz" generator, or buzzer, is shown coupled to buzzer control circuit 12. Low-pass filter 14 has an input circut coupled to the voice channel and an output circut coupled to half-wave rectifier 15. High-pass filter 16 is shown having an input circuit coupled to the voice channel and having an output circuit coupled to half-wave rectifier 17. The output circuits of the half-wave rectifiers are connected, as shown, to an adding circuit which may be simply a potentiometer 18. The adjustable tap of potentiometer 18 is coupled to trigger circuit 20 through integrator 19, which may be a 20-cycle low-pass filter. The state of trigger 20 controls the state of "buzz-hiss" switch 21 at the receiver which, in turn, selectively enables either the "buzz" generator or the "hiss" generator.

As is well known the vocoder art, the presence of voice sounds, i.e., sounds produced by the vocal cords, should result in the activation of the "buzz" generator in the receiver, and the presence of fricative sounds, i.e., non-vocal cord sounds, should result in the deactivation of the "buzz" generator and the activation of the "hiss" generator. The voice channel under typical conditions may have a frequency range between 300 and 3,000 cycles. Low-pass filter 14 readily passes signals below 600 cycles. On the other hand, high-pass filter 16 readily passes above 2,500 cycles. Half-wave rectifiers 15 passes the negative-going signals present in the lower portion of the voice channel whereas half-wave rectifier 17 passes positive-going signals in the upper frequency portion of the channel. Since the output circuits of the half-wave rectifiers are connected to a balanced adding potentiometer 18, as shown, and which which in turn is connected to integrator 19, it follows that the D.C. output signal produced by integrator 19 indicates the sum of the voice energies present in the upper and lower portions of the voice channel. If the amount of energy present in the lower portion of the channel is greater than the energy present in the upper portion of the channel where the system is balanced, it follows that the output signal produced by integrator 19 will be negative-going and it also follows that this signal will be positive-going where the amount of energy in the upper frequency portion is slightly greater than the amount of energy in the lower frequency portion.

If the D.C. output of integrator 19 is slightly negative, it is assumed that a voice signal is present in the voice channel rather than a fricative signal. This negative signal will activate trigger 20 thereby producing a mark in its output circuit, which mark is transmitted across the trasmission link and causes "buzz-hiss" switch 21 at the receiver to activate the "buzz" generator 13 rather than the "hiss" generator 22. This mark is also transmitted to the control terminal of gate 9 over lead 23 thereby to open the gate so as to allow the center frequency of the pitch tracking filter to be shifted in response to changes in frequency of the pitch signal. On the other hand, if the amount of energy in the upper frequency portion is slightly greater than the amount of energy in the lower frequency portion, the D.C. output of integrator 19 is positive-going and, therefore, no mark is produced by trigger 20. This no-mark condition disenables gate 9 so that the center frequency of pitch tracking filter 2 is held at that frequency represented by the D.C. signal present in storage capacitor 8. The aforementioned no-mark condition also causes a change of state in "buzz-hiss" switch 21 so that the "buzz" generator 13 is deactivated and "hiss" generator 22 is activated.

The preferred embodiment of the invention, disclosed in FIG. 2, is similar in numerous respects to the prior art "buzz-hiss" decision circuit disclosed in FIG. 1. However, a second decision circuit is added which comprises adder potentiometer 25, integrator 26, and trigger 27, connected as shown. The output circuit of trigger 27 is coupled to gate control lead 23' and the output circuit of trigger 28 is connected through the transmission link to the "buzz-hiss" switch 21, but is not connected to lead 23' as in the circuit disclosed in FIG. 1. As mentioned hereinabove, it has been found that the synthesized sound is more degraded by having the "hiss" generator erroneously enabled for voice sounds than it is by having the "buzz" generator erroneously enabled during the transmission of fricative sounds. Accordingly, the tap of potentiometer 18' is moved in an upward direction, as shown in FIG. 2, so that the first decision circuit, including potentiometer 18', is somewhat unbalanced. Under these circumstances, the energy content within the upper frequency portion of the voice spectrum must be substantially greater than the energy content in the lower frequency portion of the voice spectrum in order to effect the removal of a negative signal at the output of integrator 19' so as to cause the "buzz-hiss" switch 21' to change over to enable the "hiss" generator. In other words, the first decision circuit is intentionally unbalanced so as to cause the trigger to become reset only where a definite indication of fricative energy exists.

The second decision circuit, which is connected to control gate 9', is unbalanced in an opposite sense, as shown. In other words, the adjustable tap of potentiometer 25 is moved downward. Under these circumstances, the energy in the lower frequency portion of the voice channel must be substantially greater than the energy in the upper frequency portion of the voice channel in order to cause integrator 26 to activate trigger 27 which, in turn, places a mark on lead 23' to enable 9'. In other words, gate 9' will be enabled to allow the pitch tracking filter setting to be changed only where a definite indication of the presence of voiced sound is given.

In summary, the circuitry of FIG. 2 will cause the "hiss" generator to be enabled only where a very definite indication is given that fricative energy is being transmitted. In addition, gate 9' will be enabled only where a very definite indication is given that voiced energy and not fricative energy is being transmitted.

While there has been disclosed what is at present considered to be the preferred embodiment of the invention, other modifications will readily occur to those skilled in the art. It is not, therefore, desired that the invention be limited to the specific arrangement shown and described, and it is intended in the appended claims to cover all such modifications as fall within the true spirit and scope of the invention.

What is claimed is:

1. In a vocoder, a voice channel, a pitch derivation circuit for deriving the pitch frequency present in said voice channel, said pitch derivation circuit having an input circuit and an output circuit, means for coupling the input circuit of said pitch derivation circuit to said voice channel, a pitch tracking filter having an input circuit and an output circuit, a buzz generator having an input circuit, a hiss generator, means for coupling the output circuit of said pitch derivation circuit to the input circuit of said pitch tracking filter, means coupled between the output circuit of said pitch tracking filter and the input circuit of said buzz generator for causing the operating frequency of said buzz generator to be controlled in accordance with the frequency of the pitch signal produced in the output circuit of said pitch tracking filter, a first decision circuit having an input circuit coupled to said voice channel for changing the center frequency of said pitch tracking filter in accordance with the frequency of the signal present in the output circuit of said pitch tracking filter only where a substantial majority of the energy in said voice channel is distributed in the lower frequency portion of said voice channel, a second decision circuit having an output circuit and an input circuit coupled to said voice channel for producing a switching signal only where a substantial majority of the energy in said voice channel is distributed in the upper frequency portion of said voice channel, a buzz-hiss switch having a control circuit coupled to the output circuit of said second decision circuit and which disenables said buzz generator and enables said hiss generator upon the receipt of said switching signal.

2. In a vocoder, a voice channel, a pitch derivation circuit for deriving the pitch frequency present in said voice channel, said pitch derivation circuit having an input circuit and an output circuit, means for coupling the input circuit of said pitch derivation circuit to said voice channel, a pitch tracking filter having an input circuit and an output circuit, a buzz generator having an input circuit, a hiss generator, means for coupling the output circuit of said pitch derivation circuit to the input circuit of said pitch tracking filter, means coupled between the output circuit of said pitch tracking filter and the input circuit of said buzz generator for causing the operating frequency of said buzz generator to be controlled in accordance with the frequency of the pitch signal produced in the output circuit of said pitch tracking filter, a first decision circuit having an input circuit coupled to said voice channel for changing the center frequency of said pitch tracking filter in accordance with the frequency of the signal present in the output circuit of said pitch tracking filter only where a substantial majority of the energy in said voice channel is distributed in the lower frequency portion of said voice channel, a second decision circuit having an output circuit and an input circuit coupled to said voice channel for producing a switching signal only where a substantial majority of the energy in said voice channel is distributed in the upper frequency portion of said voice channel, a buzz-hiss switch having a control circuit coupled to the output circuit of said second decision circuit and which disenables said buzz generator and enables said hiss generator upon the receipt of said switching signal.

3. In a vocoder, a voice channel, a pitch derivation circuit for deriving the pitch frequency present in said voice channel, said pitch derivation circuit having an input circuit and an output circuit, means for coupling the input circuit of said pitch derivation circuit to said voice channel, a pitch tracking filter having an input circuit and an output circuit, a buzz generator having an input circuit, a hiss generator, means for coupling the output circuit of said pitch derivation circuit to the input circuit of said pitch tracking filter, means coupled between the output circuit of said pitch tracking filter and the input circuit of said buzz generator for causing the operating frequency of said buzz generator to be controlled in accordance with the frequency of the pitch signal produced in the output circuit of said pitch tracking filter, means for producing a signal indicative of the frequency of the signal present in the output circuit of said pitch tracking filter, means for storing said last-named signal, means coupled to said means for storing for changing the center frequency of said pitch tracking filter in accordance with said last-named signal, a first decision circuit having an input circuit coupled to said voice channel for permitting said last-named signal stored in said storage circuit to be altered by changes in the frequency of the signal present in the output circuit of said pitch tracking filter only where a substantial majority of the energy in said voice channel is distributed in the lower frequency portion of said voice channel, a second decision circuit having an output circuit and an input circuit coupled to said voice channel for producing a switching signal only where a substantial majority of the energy in said voice channel is distributed in the upper frequency portion of said voice channel, a buzz-hiss switch having a control circuit coupled to the output circuit of said second decision circuit and which disenables said buzz generator and enables said hiss generator upon the receipt of said switching signal.

4. In a vocoder, a voice channel, a pitch derivation circuit for deriving the pitch frequency present in said voice channel, said pitch derivation circuit having an input circuit and an output circuit, means for coupling the input circuit of said pitch derivation circuit to said voice channel, a pitch tracking filter having an input circuit and an output circuit, a buzz generator having an input circuit, means for coupling the output circuit of said pitch derivation circuit to the input circuit of said pitch tracking filter, means coupled between the output circuit of said pitch tracking filter and the input circuit of said buzz generator for causing the operating frequency of said buzz generator to be controlled in accordance with the frequency of the pitch signal produced in the output circuit of said pitch tracking filter, a decision circuit having an input circuit coupled to said voice channel for changing the center frequency of said pitch tracking filter in accordance with the frequency of the signal present in the output circuit of said pitch tracking filter only where a substantial majority of the energy in said voice channel is distributed in the lower frequency portion of said voice channel.

5. In a vocoder, a voice channel, a pitch derivation circuit for deriving the pitch frequency present in said voice channel, said pitch derivation circuit having an input circuit and an output circuit, means for coupling the input circuit of said pitch derivation circuit to said voice channel, a pitch tracking filter having an input circuit and an output circuit a buzz generator having an input circuit, a hiss generator, means for coupling the output circuit of said pitch derivation circuit to the input of said pitch tracking filter, means coupled between the output circuit of said pitch tracking filter and the input circuit of said buzz generator for causing the operating frequency of said buzz generator to be controlled in accordance with the frequency of the pitch signal produced in the output circuit of said pitch tracking filter, a decision circuit having an input circuit coupled to said voice channel for producing a switching signal only where a substantial majority of the energy in said voice channel is distributed in the upper frequency portion of said voice channel, a buzz-hiss switch having a control circuit coupled to the output circuit of said decision circuit and which disenables said buzz generator and enables said hiss generator upon the receipt of said switching signal.

References Cited by the Examiner

UNITED STATES PATENTS 2,635,146 4/53 Steinberg ______________ 179—1
3,020,344 2/62 Prestigiacomo ___________ 179—1

ROBERT H. ROSE, *Primary Examiner.*